Patented June 22, 1948

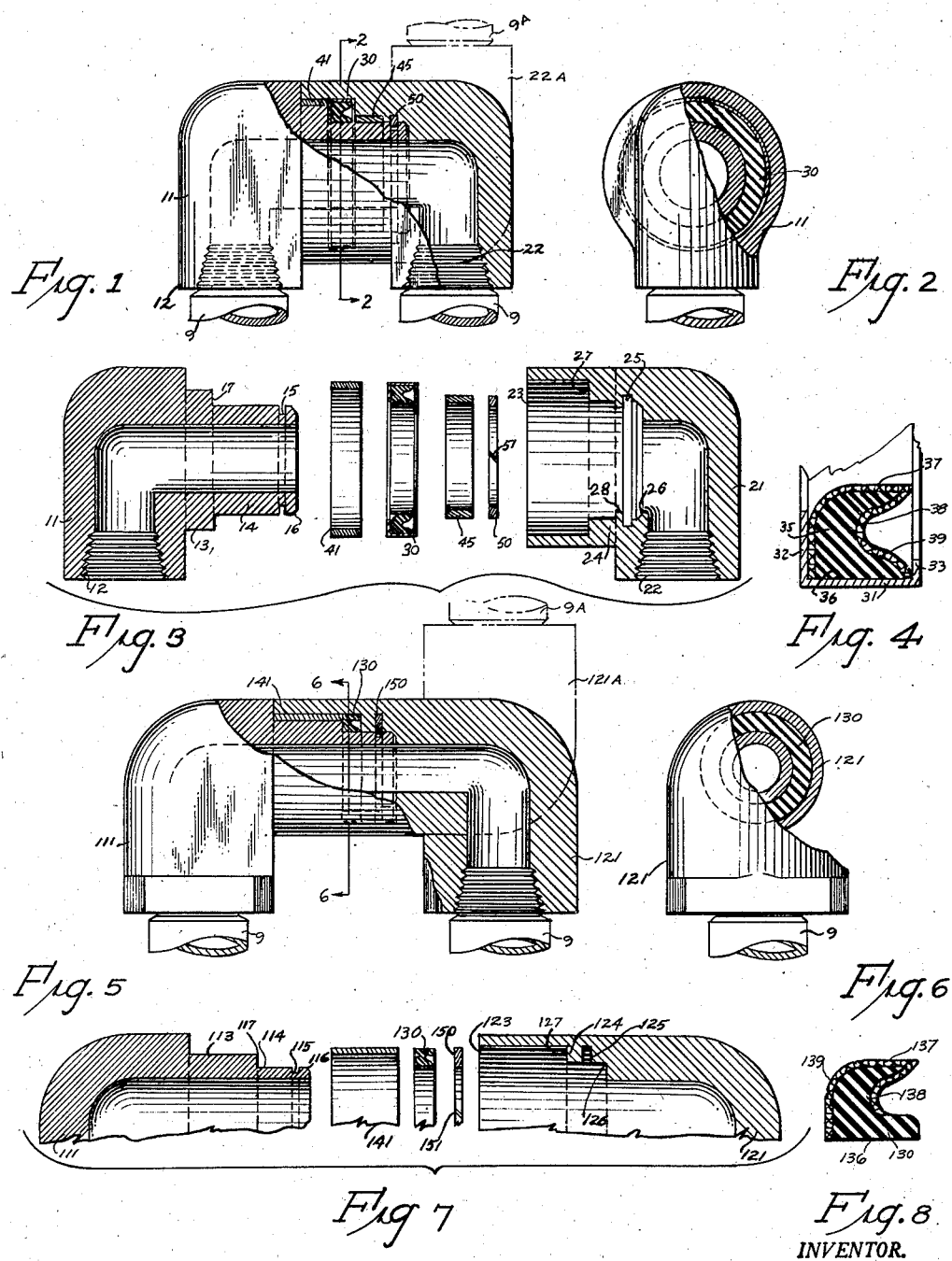

2,443,993

UNITED STATES PATENT OFFICE 2,443,993

SWIVEL COUPLING

Frank J. Schenkelberger, Cleveland, Ohio

Application January 26, 1945, Serial No. 574,749

5 Claims. (Cl. 285—97.1)

This invention relates to couplings and particularly to swivel or flexible joints used for conducting fluids such as a coolant to a cutting or a grinding tool.

The primary object of this invention is to construct a simple, unitary and economical device which is durable, efficient and capable of withstanding a relatively high degree of pressure without leaking.

Another object is to provide a coupling of the type mentioned which is capable of making unlimited and unrestricted rotations in either direction.

A further object of this invention is to provide an assembly which utilizes a snap split ring which inseparably locks all the elements together at one time.

A still further object is to equip such device with a pressure-sensitive fluid seal that tightens as the pressure of the leakage against it increases.

These and other objects and features of the invention will become apparent from a reading of the following description, together with the accompanying drawing, in which like parts are referred to and indicated by like reference characters and wherein:

Figure 1 is a side elevation of the preferred form of coupling, with certain parts broken away to show internal structure;

Figure 2 is a vertical cross-sectional view of the device, taken along the line and in the direction of the arrows 2—2 of the Figure 1;

Figure 3 is an exploded view of the coupling shown in the Figures 1 and 2;

Figure 4 is an enlarged sectional view of a portion of the pressure-sensitive seal used in the preferred form of the coupling;

Figure 5 is a side elevation of a modified form of swivel coupling, with certain parts broken away to show internal structure;

Figure 6 is a vertical cross-sectional view of the modified form of coupling, taken along the line and in the direction of the arrows 6—6 of the Figure 5;

Figure 7 is an exploded view of a part of the coupling shown in the Figures 5 and 6; and Figure 8 is an enlarged cross-sectional view of a part of a slightly different type of pressure-sensitive seal which may be used with either form of the coupling.

Preferred form

The preferred form of the device shown in the Figures 1 to 4 inclusive consists of male and female members, two bushings, a pressure-sensitive seal and a snap or split ring. Each of these elements will be described in detail and in the order just set forth.

The male member consists of a tubular portion 11 which may be either angular, as shown, or straight. The outer or free end is provided with screw threads 12 for connection to a pipe or conduit 9. Its inner end has concentric annular portions integral therewith. The large annular portion 13 is separated from the small annular portion 14 at the radial shoulder 17. The peripheral edge 16 of the small annular portion 14 is beveled, as shown in the Figure 3, and has an external circumferential groove 15 a short distance inside the bevelled edge 16. The part of the annular portion 14 between the groove 15 and the bevelled edge 16 is referred to herein as a collar portion.

The female member 21 consists of a tubular portion which similarly is provided with screw threads 22 for engaging a pipe or conduit 9. This member also may be either angular, as shown, or perfectly straight, as desired. The female member 21 similarly has ring portions 23 and 24 integral therewith, as indicated in the drawing. The large ring portion is indicated by the character 23 and the small ring portion is indicated by the character 24. The ring portions are concentric, as shown, are separated at the radial shoulder 27, and the inner end of the small ring portion 24 is bevelled to form a seat 26 for the bevelled peripheral edge 16 of the male member. The small ring portion 24 has an inwardly directed collar or flange 28 which forms, between the seat 26 and the shoulder 27, an internal annular groove 25.

The two bushing members 41 and 45 are simply conventional bronze or self-lubricating bushings which fit between the ring and annular portions of the male and female members respectively. The large bushing 41 fits between the large annular portion 13 and the large ring portion 23, and the small bushing 45 fits between the small annular portion 14 and the small ring portion 24.

The pressure-sensitive seal member 30 consists of a short, tubular metal ring which has a large flange portion 32 on one side thereof, a small flange 33 on the opposite side, and a rubber gasket 35 therein. The outer surface 36 of the rubber gasket 35 is tightly cemented or otherwise sealed to the inner surface of the metal ring 31. The side of the gasket 35 facing the large flange 32 is convex, while the side 38 of the gasket facing the small flange 33 is concave, as shown in the Figure 4. Both the convex and concave surfaces are covered with a smooth textile fabric 39. The edge 37 where the covered surfaces meet is normally loose, but when assembled, is capable of making a tight fluid-proof contact with the small annular portion 14. Increased fluid pressure against the concave surface 38 causes it to spread and forces the edge 37 tighter against the male member than otherwise. The outer surface of the metal ring 31 is press or snug fitted to the inner surface of the small ring portion 24 and is therefore leak-proof. The seal 30 is mounted on the male member so that the large flange 32 faces or abuts the bushing 41 and shoulder 17 and so that the small flange 33 faces and abuts the shoulder 27 of the female member.

The split or snap ring 50 is made to fit the grooves 15 and 25 simultaneously. It is cut diagonally at 51 so that it might be spread slightly when the bevelled edge 16 is forced through it. This ring is loosely mounted in the internal annular groove 25 and more tightly mounted in the external circumferential groove 15, and simply serves as an automatic lock for retaining the members and elements together.

During assembly, the large bushing 41 is first placed on the large annular portion 13 of the male member; the seal 30 and the small bushing 45 are then mounted on the small annular portion 14 as heretofore mentioned. The snap ring 50 is then distorted or is constricted and inserted inside the internal annular groove 25. The two members 11 and 21, with their respective parts, are placed and pressed together until the snap ring 50 opens and closes in the grooves 15 and 25. The parts then assume the respective positions shown in the Figure 1.

The two members may be turned with respect to each other in either direction and without limit, and are normally inseparable. In the Figure 1, the reference characters 9a and 22a indicate the alternate positions of the female member 22 and a conduit 9a attached thereto.

Modified form

The modified form of the invention shown in the Figures 5, 6, 7 and 8 is very similar to the preferred form of coupling heretofore described. It differs only in two respects. It uses one bronze bushing instead of two, and it has a simpler and less expensive type of pressure-sensitive fluid seal.

The modified form of the invention consists of a male member, indicated by the reference character 111, and a female member, indicated by the reference character 121. The male member 111 is shaped substantially the same as the previously described male member 11 of the preferred form. It too has a threaded means at its free end for receiving a conduit 9. It also has integral large and small annular concentric portions 113 and 114. The small annular portion 114 is separated from the large annular portion 113 by a radially extending shoulder 117. It has a peripheral bevelled edge 116 and an external circumferential groove 115 adjacent thereto.

The female member 121 has a threaded opening for receiving the conduit 9 and has a large ring portion 123 and a small ring portion 124 at the end opposite the threaded opening. The ring portions are integral with the body member and are concentric with the fluid passage therein. The large ring portion 123 is separated from the small ring portion 124 by the radial shoulder 127. The small ring portion 124 also has a bevelled seat 126 for receiving the peripheral edge 116 of the male member, and an internal annular groove 125 between the seat 126 and the shoulder 127.

The single wide bushing 141 of the modified form fits between the large annular portion 113 and the large ring portion 123, as shown in the Figure 5.

The pressure-sensitive fluid seal used with the modified form is very similar to the seal previously described and used with the preferred form of coupling. It differs from the preferred form, however, in that it does not have a flanged metal ring similar to that indicated by the reference character 31. The instant seal 130 is also made of rubber and has an outer portion or peripheral surface 136 which is cemented to or is in tight contact with the inner surface of the large ring portion 123. Its convex side is covered with a textile fabric 139 and abuts closely against the shoulder 117 and the bushing 141 on the male member 111. It also has a concave circular side wall 138 which may be spread inwardly by the pressure of the fluid thereagainst. When the concave side is spread open, the inner surface 137 fits tightly against the small annular portion 114, thus preventing leakage of the fluid through or past the bushing 141. The concave side wall of the seal or gasket 130 faces the radial shoulder 127 between the large and small ring portions.

The split ring 150 used with the modified form of the invention is similar to the one used in the preferred form. It is made to spread into and engage the two facing external annular circumferential groove 115 and the internal annular groove 125 simultaneously. It also may be spread or enlarged during assembly by the insertion of the bevelled peripheral edge 116 through it.

The Figure 5 shows, in broken lines and by the reference character 121a, the alternate position of the female member 121, and also shows, by the reference character 9a, the conduit attached thereto.

This modified form of the invention may also be made with the preferred type of seal, and it should be understood also that the preferred form of the invention may also be made with the simpler type of seal shown in the Figure 8.

Having thus disclosed the invention in its preferred forms, it should be understood that the inventions as described and illustrated are not to be considered in a limiting sense as there may be many other forms or modifications of a swivel coupling which may also be regarded as coming within the scope of the appended claims.

I claim:

1. A swivel coupling, comprising in combination, a tubular female member including means for engaging a fluid conduit at one end thereof and having a ring portion integral therewith at the opposite end thereof, the said ring portion having an inwardly directed flange therein, a snap ring loosely engaged by the said flange, and a tubular male member including means for engaging a fluid conduit at one end thereof and having an annular portion integral therewith at the opposite end thereof and engageable by the said ring portion, the said ring portion having a bevelled peripheral edge engageable with the snap ring and an external circumferential groove therein receiving the said snap ring.

2. A coupling of the type defined in claim 1 and further characterized by the said ring portion having an inwardly extending pressure sensitive fluid seal mounted therein and rotatably engageable with the annular portion.

3. A swivel coupling, comprising in combination, a tubular female member including small and large ring portions integral therewith and having a first radial shoulder between the said ring portions, the said small ring portion having an internal annular groove therein, a tubular male member including small and large annular portions integral therewith and having a second radial shoulder between the said annular portions, the said small annular portion having a bevelled peripheral edge and an external circumferential groove therein, small and large bushings mounted between the respective small and large ring and annular portions, a pressure sensitive fluid seal between the first and second radial shoulders, and a snap ring spreadable by the said bevelled edge and simultaneously receivable by the said internal and external grooves in a manner whereby the said members, bushings and seal are locked together.

4. A swivel coupling, comprising in combination, a tubular female member including small and large ring portions integral therewith and having a first radial shoulder between the said ring portions, the said small ring portion having an internal annular groove therein, a tubular male member including small and large annular portions integral therewith and having a second radial shoulder between the said annular portions, the said small annular portion having a bevelled peripheral edge and an external circumferential groove therein, a bushing between the large ring and annular portions, a pressure sensitive fluid seal between the first and second radial shoulders, and a snap ring spreadable by the said bevelled edge and simultaneously receivable by the said internal and external grooves in a manner whereby the said members, bushing and seal are locked together.

5. A swivel coupling, comprising in combination, a first tubular member including means for engaging a fluid conduit on one end thereof and having a first collar portion integral therewith and spaced from the engaging means, a second tubular member engageable by the first tubular member and including means for engaging a fluid conduit at one end thereof and having a second collar portion integral therewith and spaced from the engaging means, the first of the said collar portions having a bevelled edge, and a snap ring distortable by the bevelled edge and engageable by the said collar portions.

FRANK J. SCHENKELBERGER.

REFERENCES CITED

The following references are of record in the file of this patent:

UNITED STATES PATENTS

| Number | Name | Date |
| --- | --- | --- |
| 324,874 | Morton | Aug. 25, 1885 |
| 1,106,918 | Bordo | Aug. 11, 1914 |
| 1,884,266 | Russell | Oct. 25, 1932 |
| 2,066,711 | Banks | Jan. 5, 1937 |